United States Patent [19]
Basuthakur et al.

[11] Patent Number: 5,810,297
[45] Date of Patent: Sep. 22, 1998

[54] SATELLITE CLUSTER ATTITUDE/ORBIT DETERMINATION AND CONTROL SYSTEM AND METHOD

[76] Inventors: Sibnath Basuthakur, 3534 E. Cherokee La., Phoenix, Ariz. 85044; Rodrigo Ibanez-Meier, 3650 S. Vista Pl., Chandler, Ariz. 85248; Brian Daniel, 11817 S. Coconino, Phoenix, Ariz. 85044

[21] Appl. No.: 639,590

[22] Filed: Apr. 29, 1996

[51] Int. Cl.⁶ ...................................... B64G 1/10
[52] U.S. Cl. ................ 244/176; 244/158 R; 701/13; 342/356
[58] Field of Search ................ 244/158 R, 176, 244/164; 701/13; 455/13.1, 13.2, 12.1; 370/316; 342/352–358

[56] References Cited

U.S. PATENT DOCUMENTS

| | | | |
|---|---|---|---|
| 4,375,697 | 3/1983 | Visher | 455/13.1 |
| 4,691,882 | 9/1987 | Young | 244/158 R |
| 5,311,435 | 5/1994 | Yocum et al. | 244/164 |
| 5,396,643 | 3/1995 | Frenzer et al. | 455/13.1 |
| 5,506,780 | 4/1996 | Montenbruck et al. | 244/164 |

FOREIGN PATENT DOCUMENTS

3145572  5/1983  Germany ..................... 244/158 R

*Primary Examiner*—Galen L. Barefoot
*Attorney, Agent, or Firm*—Walter W. Nielsen

[57] ABSTRACT

A satellite attitude/orbit control system (300) for managing a satellite cluster (200) in a satellite constellation (207). A satellite cluster (200) comprises a master satellite (203) and secondary satellites (201, 202, 204, 204). The master satellite (203) receives sensor data from secondary satellites (201, 202, 204, 204) and combines such secondary sensor data with master sensor data from a master satellite (203) to calculate attitude/orbit estimates for all satellites within the satellite cluster (200). Attitude estimates are forwarded to each satellite for initiation of attitude/orbit control. Each satellite cluster (200) subordinates to a constellation master satellite (301) for receiving additional attitude/orbit estimates for use in determining and controlling satellite attitude/orbits.

17 Claims, 4 Drawing Sheets

SATELLITE CLUSTER ATTITUDE/ORBIT DETERMINATION AND CONTROL SYSTEM AND METHOD

FIELD OF THE INVENTION

This invention relates generally to the field of satellite attitude/orbit and control systems and methods and, more specifically, to attitude/orbit determination and control of a cluster or group of satellites.

BACKGROUND OF THE INVENTION

Reliable attitude/orbit control methods are necessary to assure adequate orientation and pointing accuracy of communication antennas and other payload sensors. Torque disturbances due to gravitational and non-gravitational (e.g. solar radiation pressure) forces and mis-alignments of thrusters, need to be compensated by an attitude/orbit control system.

An attitude/orbit control system of a typical satellite generally consists of a set of sensors providing attitude/orbit information and a set of actuators that are controlled to provide attitude/orbit adjustments as required. Typical sensors include earth sensors, sun sensors, RF sensors, gyroscopes and star sensors. Typical actuators include reaction wheels, momentum wheels, and thrusters.

Equally important to attitude control is orbit determination and control (e.g., station keeping). Satellites are subject to gravitational anomalies (e.g. the equatorial earth bulge) and other force disturbances, such as drag and solar radiation pressure, that produce periodic and secular drifts from their nominal orbit. Orbit perturbations such as the "north-south oscillation" grow in amplitude unless the orbits are controlled by firing thrusters.

As satellite constellations expand and include increasing numbers of space-vehicles, there is an incentive to define system configurations at the constellation level that optimize leveraging of system available resources in several areas. Attitude/Orbit determination and control is one of these areas.

Sensors, processors, telemetry encoder units (TEU) and command decoder units (CDUs) contribute to one of the primary costs of individual satellites. Thus, there is incentive to minimize populating each satellite with a full suite of each of these components.

While individual independent satellite attitude/orbit determination and control has been the common practice in the past, the recent appearance of satellite constellations (e.g. NAVSTAR GPS and the Iridium system) motivates the implementation of constellation-level design considerations. In the absence of satellite constellations, the conventional approach did not have to address these new considerations and benefits. The attitude determination and control function at the constellation level has been implemented using an individual, dedicated satellite attitude/orbit determination and control (AOCS) approach.

However, sharing of information among satellites in a constellation results in reliability improvements by offsetting errors incurred by individual sensor mis-calibrations and potential single-point failure scenarios. In effect, while a constellation requires performance of each of its satellites, it is desirable to minimize the risk to an individual satellite, by making resources from the rest of the constellation available for its attitude/orbit determination and control.

While the implementation of a full set of sensors and actuators for each satellite may be adequate, it ignores the leverage provided by other satellites in the constellation. First, there is an obvious significant reduction in cost, when the numbers of sensors are reduced, which may be used instead to improve the payload capacity and performance. Second, it does not take advantage of the benefits in accuracy resulting from the sharing and combined processing of attitude/orbit information of the nearby satellites. Third, it does not take advantage of the increased reliability that results from the elimination of mis-calibrated and/or bad individual-sensor data.

Thus, what is needed is a system and method for managing a satellite cluster as a group by reducing the number of sensors and processors required on each satellite.

What is also needed is a system and method for cooperatively generating attitude/orbit estimates by sharing sensor data and processing capability in a satellite cluster.

BRIEF DESCRIPTION OF THE DRAWINGS

The invention is pointed out with particularity in the appended claims. However, a more complete understanding of the present invention may be derived by referring to the detailed description and claims when considered in connection with the figures:

The exemplification set out herein illustrates a preferred embodiment of the invention in one form thereof, and such exemplification is not intended to be construed as limiting in any manner.

DETAILED DESCRIPTION OF THE DRAWING

The present invention provides, among other things, a satellite attitude/orbit control system for managing a satellite cluster in a satellite constellation. A cluster is comprised of a master satellite and secondary satellites wherein a master satellite receives sensor information from secondary satellites and estimates attitude/orbit control parameters for execution.

Figure 1:
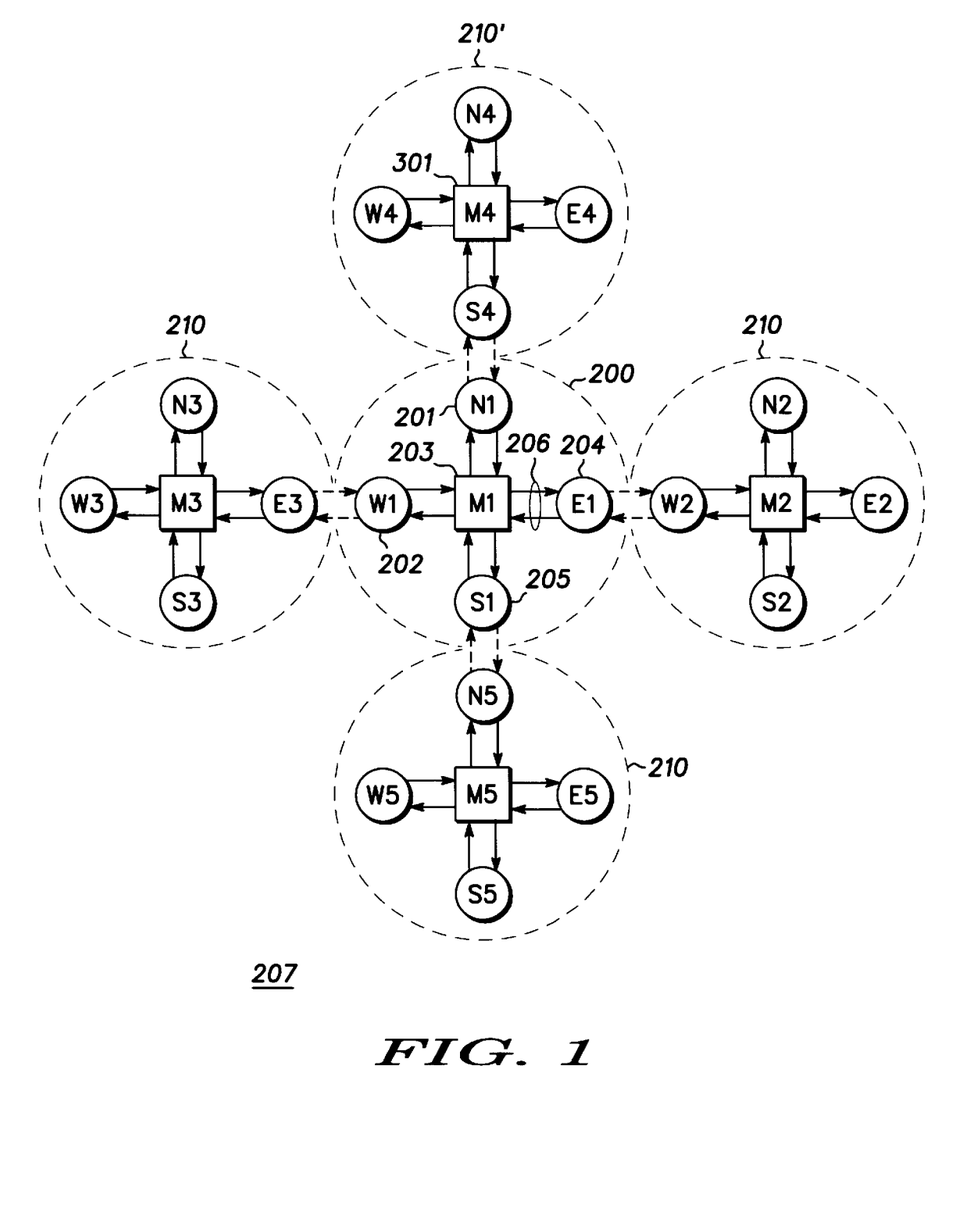
FIG. 1 is a diagram showing a satellite cluster and adjacent clusters, in accordance with a preferred embodiment of the present invention.

FIG. 1 is a diagram showing a satellite cluster and adjacent clusters, in accordance with a preferred embodiment of the present invention.

A satellite cluster 200 may be defined having a master satellite 203 and a number of secondary satellites 201, 202, 204, and 205 connected by inter-satellite links 206. Satellite cluster 200, in turn, may connect together with adjacent satellite clusters 210 to define the entire constellation 207. Secondary satellites 201, 202, 204, and 205 share attitude/orbit, and control information using inter-satellite links 206 among themselves as well as with master satellite 203.

Master satellite 203 provides reference information against which secondary satellites 201, 202, 204, and 205 correct attitude and orbit. This in effect "reuses" the master satellite's attitude/orbit and control information in satellite cluster 200, thereby eliminating the need for several sensors, actuators and on-board processors in secondary satellites 201, 202, 204, and 205.

In addition, a given satellite cluster in constellation 207 may serve as a constellation master cluster 210' having a constellation master satellite 301 for providing yet another level of accuracy and redundancy checks. Constellation master satellite 301 processes sensor data and computes actuation signals for constellation 207 which may be combined and compared with individual satellite estimates.

Additionally, in constellation 207, at any given instant in time, each adjacent cluster 210 may be controlled with reference to master cluster 210'. A single master satellite can in fact be defined in this configuration. While such an operation mode is in fact possible, a constellation of relatively autonomous clusters, each of which having the capability of being a constellation master cluster if necessary, provides a balance in redundancy, while achieving the goal of reducing the number of sensors, actuators, and on-board processors (cost) of constellation 207.

Constellation 207 may be controlled at the level of a "master lattice". In such a configuration, disturbances that affect the entire constellation can be controlled at the master level, while the secondaries or slaves follow suit by virtue of the cluster configuration. More generally, master satellites define an average reference frame in which the individual motions of secondary satellites can be viewed as perturbations. It should be noted that while master satellites remain the primary satellites, the cluster assignment can be dynamically chosen and optimized, for example, for different latitudes.

Attitude/orbit determination and control may also be carried out at a constellation level by simultaneously processing each cluster sensor information, in one Extended Kalman filter. This results in high space-and-time resolution reference information for each individual sensor through constellation 207, against which deviations may be attributed to absolute attitude/orbit information. As an example, infra-red (IR) sensors in a highly symmetric constellation may generate an estimated Earth radiance, space and time-dependent, which combines sensor information, while averaging out zero-mean sensor defects or mis-calibrations. Such an Earth radiance estimate may in turn be used as a more accurate reference baseline for each detector output at subsequent times. By obtaining more accurate attitude/orbit estimates in this manner, higher-tolerance control may be achieved from less accurate actuators and sensors. Such constellation attitude/orbit determination and control methods exploit known benefits of Extended Kalman filters that effectively synthesize multiple measurements while filtering-out data noise.

Furthermore, in constellations that combine Low-Earth Orbit, Medium-Earth Orbit and Geosynchronous-Earth Orbit satellites as sub-systems, the cluster concept may be generalized to define a sequence of reference satellites, thereby leveraging the different sensors of each sub-system. The use of a global positioning system (GPS) for orbit and attitude/orbit determination is, to a first order, an example of this concept. The GPS constellation, provides a reference frame for other constellations, which in turn can provide a reference frame to other subsystems. A very accurate and robust estimation strategy (e.g. Extended Kalman filtering) may be employed to reduce the overall number of sensors, while assuring sufficient observability to accomplish the mission control objectives of each sub-system.

Figure 2:
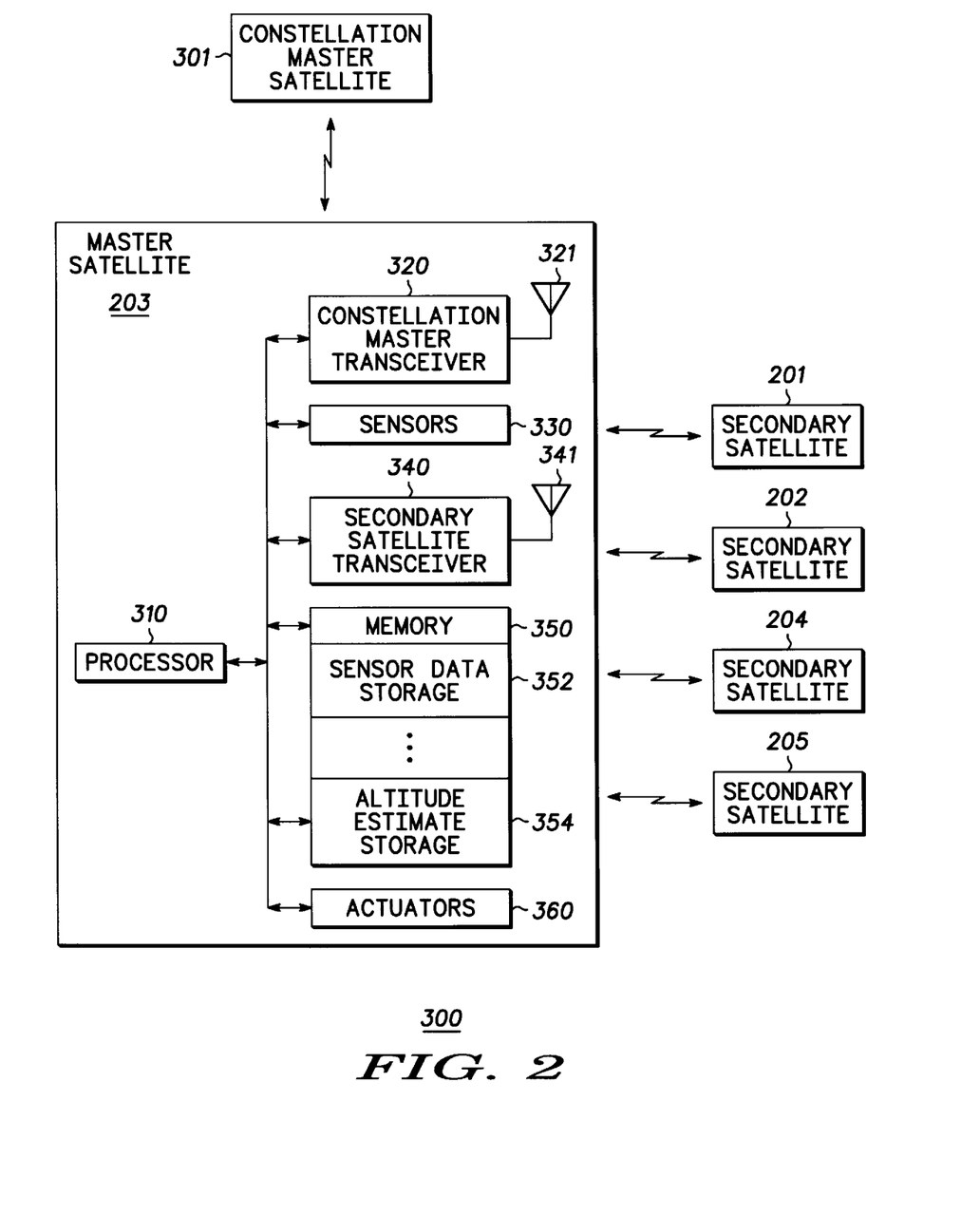
FIG. 2 is a diagram showing a block diagram of a satellite cluster attitude/orbit control system, in accordance with a preferred embodiment of the present invention.

FIG. 2 is a diagram showing a block diagram of a satellite cluster attitude/orbit control system, in accordance with a preferred embodiment of the present invention.

In a satellite cluster attitude/orbit control system, three major functional elements, viz. sensors, processors with embedded software, and actuators, play the most dominant role in the architectural design. Typical sun and earth sensors provide three-axis attitude determination with GPS sensors providing orbit and attitude information. A set of three-axis gyros may provide rate information about the body axes, while momentum wheels may provide pitch bias momentum capability. Magnetic torquer bars may provide momentum dumping capability in all axes. Propulsion thrusters or actuators provide attitude stabilization during ascent, acquisition, and station-keeping operations.

A satellite cluster attitude/orbit control system 300 manages a satellite cluster 200 by monitoring and controlling master satellite 203 and secondary satellites 201, 202, 204, and 205. Master satellite 203 is comprised of sensors 330, secondary satellite transceiver 340, processor 310, memory 350, actuators 360, and constellation master transceiver 320.

Sensors 330 gather master sensor data relating to master satellite 203. In a preferred embodiment where satellite cluster attitude/orbit control system 300 is deployed in a polar orbit constellation, master satellite 203 may be configured with coarse and fine earth sensors and one three-axis gyro. In addition, an orbit determination sensor (e.g. a GPS receiver) and an array mounted sun sensor may be installed. A patch antenna of the GPS receiver may be installed on the anti-nadir side of master satellite 203. For secondary satellites 201, 202, 204, and 205, only two (one east & one north) earth sensor detectors need be installed. As the earth horizon, as seen by the secondary detector, changes as a result of attitude errors, instead of comparing two east/west detector outputs for roll, or two north/south detector outputs for pitch, as done for master satellite 203, secondary satellites 201, 202, 204, and 205 compare their single detector output of east or north earth sensor against a reference roll or pitch sensor output provided by master satellite 203. For radiance compensation, each master satellite detector outputs as well as secondary satellite outputs may be used simultaneously to provide radiance compensation for all master and secondary satellites in constellation 207 (FIG. 1).

An alternative configuration of sensors 330 include sharing: (i) the sensing of the spacecraft attitude through the use of a coarse earth sensor during ascent, (ii) rate through the use of a gyro, and (iii) orbit information with a GPS within the cluster if master satellite 203 and secondary satellites 201, 202, 204, and 205 are bundled together during the ascent phase. Bundled satellites are then released when the cluster reaches an operational orbit. If the cluster is designed in an unbundled configuration during the ascent phase, the attitude sensing of secondary satellites may be realized by comparing the two detector outputs of the coarse earth sensor against the appropriate outputs of master satellite 203 after proper secondary satellite detector level altitude correction has been made.

Thus, master satellite 203 may consist of a full set (N,S,E,W) of IR radiance and attitude detectors of the earth sensor (i.e., an earth sensor can consist of several IR radiance and attitude detectors), a three-axis gyro, a set of two-axis sun sensors, which together provide three-axis attitude information.

Additionally, secondary satellites 201, 202, 204, and 205 may have less sensors than master satellite 203. Secondary satellites 201, 202, 204, and 205 have an earth sensor, with only a north-east pair of IR radiance and attitude detectors, a one-axis gyro, and a single two-axis sun sensor.

Secondary satellite transceiver 340 with antenna 341 receives secondary sensor data from secondary satellites 201, 202, 204, and 205, and master satellite 203 informs secondary satellites of said composite secondary satellite attitude/orbit estimate using secondary satellite transceiver 340.

Processor 310 coordinates other elements of master satellite 203, such as receiving from secondary satellite transceiver 340 secondary sensor data, receiving master sensor data from sensors 330, and calculating composite master satellite attitude/orbit estimate. Processor 310 additionally controls the attitude/orbit of master satellite 203 by activating actuators 360. Processor 310 calculates and estimates a composite secondary satellite attitude/orbit estimate for controlling the attitude/orbit of secondary satellites 201, 202, 204, and 205.

In a preferred embodiment, processor 310 incorporates secondary sensor data into the master sensor data prior to generating attitude/orbit estimates. Additionally, processor 310 may calculate an individual master satellite attitude/orbit estimate from the master satellite's sensor data. Processor 310 then compares an individual master satellite attitude/orbit estimate with a composite master satellite attitude/orbit estimate, and informs actuators 360 to control the attitude/orbit of master satellite 203 in response to the composite master satellite attitude/orbit estimate when such a composite master satellite attitude/orbit estimate approximates the individual master satellite attitude/orbit estimate. This tolerance or approximation may be preprogrammed or have a fixed comparative range to invalidate estimates falling outside reasonable values such as those resulting from sensor failure.

In an alternate embodiment, processor 310 combines a composite master satellite attitude/orbit estimate with an individual master satellite attitude/orbit estimate to form a combined master attitude/orbit estimate when the composite master satellite attitude/orbit estimate approximates the individual master satellite attitude/orbit estimate, and processor 310 informs actuators 360 to control the attitude/orbit of master satellite 203 in response to the combined master attitude/orbit estimate.

Processor 310 may also incorporate master sensor data into secondary sensor data prior to calculating a secondary satellite attitude/orbit estimate. Master sensor data augments secondary sensor data by providing other sensory data from sensors not necessarily present on secondary satellites 201, 202, 204, and 205. Secondary satellites 201, 202, 204, and 205 also may calculate individual secondary satellite attitude/orbit estimates from secondary sensor data. Upon receiving a composite secondary satellite attitude/orbit estimate from master satellite 203, secondary satellites 201, 202, 204, and 205 compare the individual secondary sensor data with the composite secondary satellite attitude/orbit estimate from master satellite 203, and secondary satellites 201, 202, 204, and 205 control the attitude/orbit of secondary satellites 201, 202, 204, and 205 when they approximate or are within a tolerance of each other.

Secondary satellites 201, 202, 204, and 205 may also combine a composite secondary satellite attitude/orbit estimate with the individual secondary satellite attitude/orbit estimate to form a combined secondary attitude/orbit estimate when the composite secondary satellite attitude/orbit estimate approximates the individual secondary satellite attitude/orbit estimate, and the secondary satellite controls the attitude/orbit of said secondary satellite in response to the combined secondary attitude/orbit estimate.

Constellation master transceiver 320 sends the master sensor data and the secondary sensor data through antenna 321 to constellation master satellite 301, where constellation master satellite 301 cooperates with master satellite 203 to generate a constellation master satellite attitude/orbit estimate and a constellation secondary satellite attitude/orbit estimate from the master sensor data and the secondary sensor data. Constellation master transceiver 320 receives the constellation master satellite attitude/orbit estimate and the constellation secondary satellite attitude/orbit estimate as generated by constellation master satellite 301. Processor 310 incorporates the constellation master satellite attitude/orbit estimate and said constellation secondary satellite attitude/orbit estimate into the composite master satellite attitude/orbit estimate and the composite secondary satellite attitude/orbit estimate.

Memory 350 stores program data, master sensor data, and secondary sensor data in a sensor data storage 352. Memory 350 also stores master satellite attitude/orbit estimate and secondary satellite attitude/orbit estimates in attitude/orbit estimate storage 354.

Several sensor configurations may be selected as between master satellite 203 and secondary satellite 201, 202, 204, and 205. In one embodiment where a gyro configuration is associated with a satellite cluster, each master satellite 203 may be configured with a three-axis gyro. However, secondary satellites 201, 202, 204, and 205 may be equipped with only one yaw gyro. The rates about the other two axes can be determined from the position attitude/orbits generated through the cluster configuration.

In yet another configuration having an array-mounted sun sensor for attitude/orbit determination, the sun sensor detectors may be mounted on north and south panels for the master satellite. For secondary satellites 201, 202, 204, and 205 configuration, the sun sensor detectors are mounted only on the north or south panel. Output from the detectors are then compared against appropriate output of the detectors from master satellite 203 to compute the absolute attitude/orbit of the secondary satellites 201, 202, 204, and 205.

Figure 3:
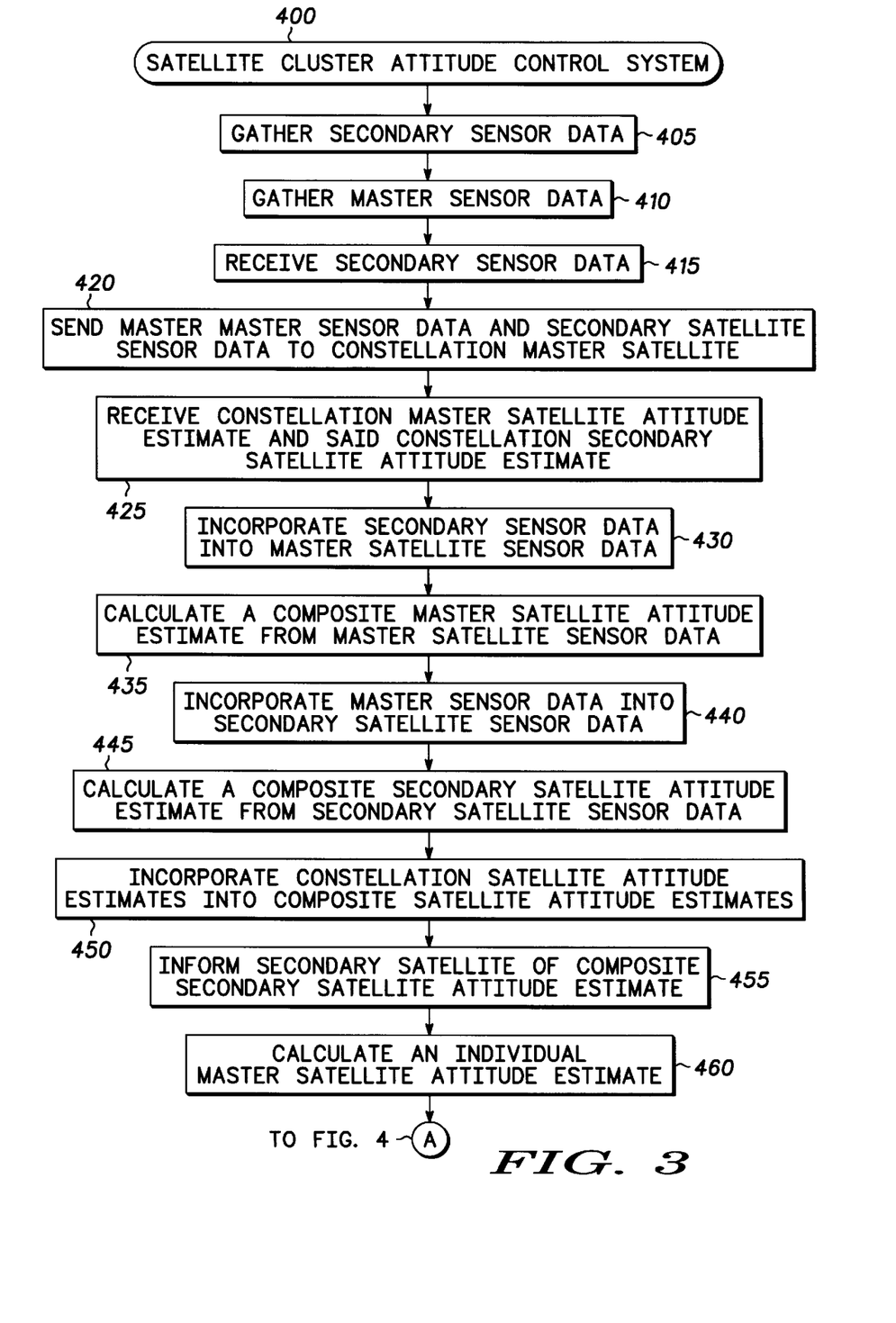
FIGS. 3 and 4 are flowcharts of a method for managing a satellite cluster, in accordance with a preferred embodiment of the present invention.
Figure 4:
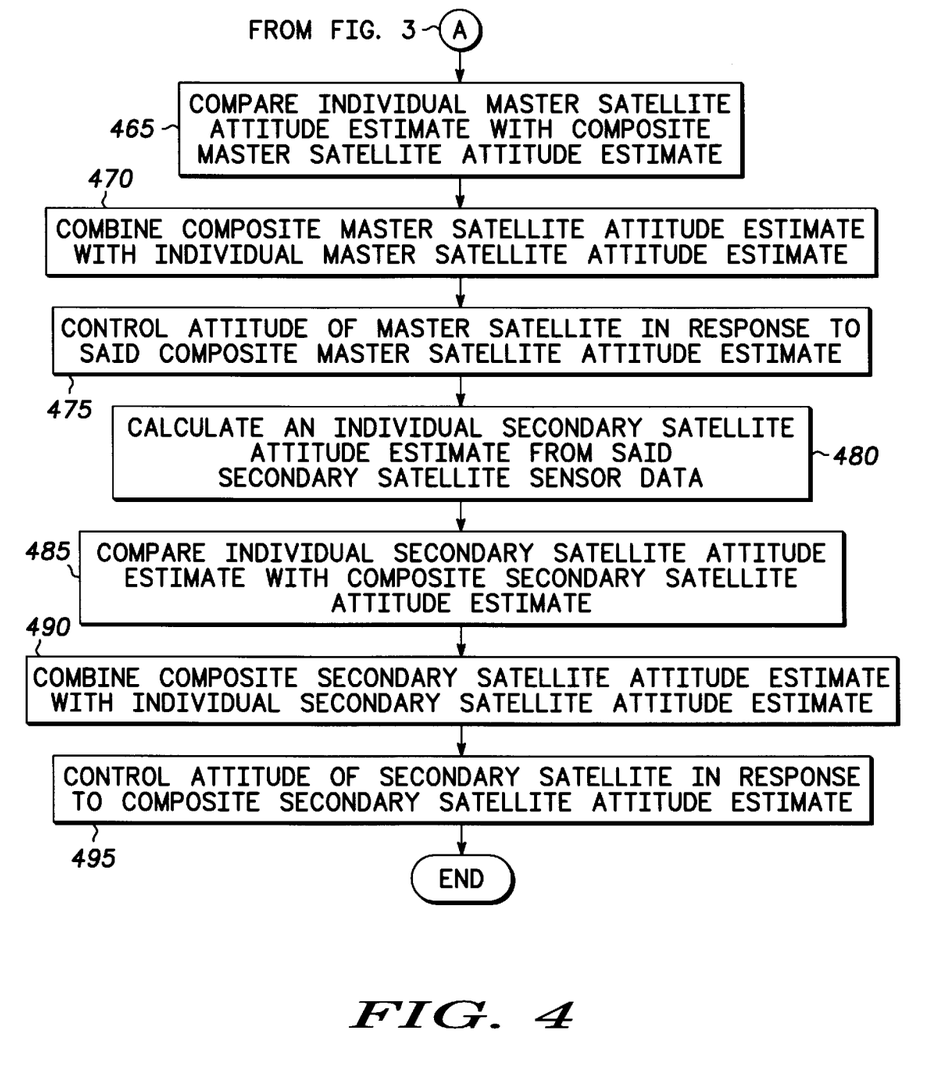

FIGS. 3 and 4 are flowcharts of a method for managing a satellite cluster, in accordance with a preferred embodiment of the present invention. A procedure 400 performs satellite attitude/orbit and control tasks for a satellite cluster.

A task 405 gathers secondary sensor data from secondary satellites 201, 202, 204, and 205. Secondary satellites may or may not have a full suite of sensors. In a preferred embodiment, secondary satellites possess a subset of sensors allowing for cost reduction in secondary satellites. Sensors are distributed over several satellites with sensor data shared among satellites.

A task 410 gathers master sensor data from sensors 330 (FIG. 2) of master satellite 203 (FIG. 2). Master satellite 203 may have a full complement of sensors, or in a preferred embodiment, a subset of sensors augments sensor data available from sensors distributed on secondary satellites 201, 202, 204, and 205 (FIG. 2).

A task 415 receives secondary sensor data from secondary satellites as gathered in task 405. Gathering from a plurality of satellites may be iterative or occur over parallel communication channels.

A task 420 sends master sensor data and secondary sensor data to constellation master satellite 301 (FIG. 1). Constellation master satellite cooperates with at least one satellite cluster 200 (FIG. 1) to generate a constellation master satellite attitude/orbit estimate and a constellation secondary satellite attitude/orbit estimate from master sensor data and secondary sensor data.

A task 425 receives the constellation master satellite attitude/orbit estimate and the constellation secondary satellite attitude/orbit estimates from constellation master satellite 301.

A task 430 incorporates secondary sensor data in master sensor data. In a sensor configuration where master satellite 203 is comprised of a subset of sensors, secondary sensor data augments the available sensor data for use by master satellite 203.

A task 435 calculates a composite master satellite attitude/orbit estimate from the master sensor data. Master sensor data may include secondary sensor data from task 430 providing augmented or redundant data.

A task 440 incorporates master sensor data into the received secondary sensor data. Master sensor data augments secondary sensor data not individually available to secondary satellites having limited sensor suites.

A task 445 calculates a composite secondary satellite attitude/orbit estimate from the secondary sensor data. Secondary sensor data may include master sensor data from task 440 providing augmented or redundant data.

A task 450 incorporates constellation master satellite attitude/orbit estimate and constellation secondary satellite attitude/orbit estimates into a composite master satellite attitude/orbit estimate and likewise into secondary satellite attitude/orbit estimates. Composite attitude/orbit estimates benefit from attitude/orbit estimates performed by constellation master satellite 301 (FIG. 2) which has additional sensory data for attitude/orbit estimation.

A task 455 informs or transmits to secondary satellites the composite secondary satellite attitude/orbit estimate as calculated and incorporated in tasks 445 and 450.

A task 460 calculates an individual master satellite attitude/orbit estimate from master sensor data exclusively. Such an approximate attitude/orbit determination provides a cross-check for attitude/orbit estimates derived from hybrid data and estimates derived solely from data derived from local or resident sensors.

A task 465 compares the individual master satellite attitude/orbit estimate with the composite master satellite attitude/orbit estimate. This prevents attitude/orbit estimates generated from faulty sensor data from being relied upon exclusively in the determination of satellite control functions.

A task 470 combines the composite master satellite attitude/orbit estimate with the individual master satellite attitude/orbit estimate to form a combined master attitude/orbit estimate when the composite master satellite attitude/orbit estimate approximates or falls within a reliability threshold with the individual master satellite attitude/orbit estimate. This approximation or reliability threshold varies with orbital restrictions and is specific to constellation arrangements and quality control parameters.

A task 475 controls the attitude/orbit of master satellite 203 in response to the composite master satellite attitude/orbit estimate when the composite master satellite attitude/orbit estimate approximates or coincides with the individual master satellite attitude/orbit estimate.

A task 480 calculates an individual secondary satellite attitude/orbit estimate from secondary sensor data exclusively. Such an approximate attitude/orbit determination provides a cross-check for attitude/orbit estimates derived from hybrid data and estimates derived solely from data derived from local or resident sensors.

A task 485 compares the individual secondary satellite attitude/orbit estimate with the composite secondary satellite attitude/orbit estimate. This prevents attitude/orbit estimates generated from faulty sensor data from being relied upon exclusively in the determination of satellite control functions.

A task 490 combines the composite secondary satellite attitude/orbit estimate with the individual secondary satellite's attitude/orbit estimate to form a combined secondary attitude/orbit estimate when the composite secondary satellite attitude/orbit estimate approximates or falls within a reliability threshold with the individual secondary satellite attitude/orbit estimate. This approximation or reliability threshold varies with orbital restrictions and is specific to constellation arrangements and quality control parameters.

A task 495 controls the attitude/orbit of secondary satellites 201, 202, 204, and 205 (FIG. 2) in response to the composite secondary satellite attitude/orbit estimate when the composite secondary satellite attitude/orbit estimate approximates or coincides with the individual secondary satellite attitude/orbit estimate. Attitude and control processing then terminates or may be repeated continuously.

Thus, a constellation-based satellite attitude/orbit determination and control system that combines attitude and orbit determination and control data from individual satellites to generate attitude/orbit estimates of satellites grouped into a cluster has been described.

Also, a method and system for managing a satellite cluster having a master satellite and secondary satellites for gathering sensor data, calculating attitude/orbit estimates, informing cluster-member satellites of these estimates, and controlling the attitude/orbit of cluster member satellites in response to these estimates has been disclosed.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a satellite attitude/orbit control system, a method for managing a satellite cluster, said satellite cluster having a master satellite for monitoring and controlling a secondary non-geostationary satellite, and wherein said master satellite gathers master sensor data from said master satellite and further receives secondary sensor data from said secondary non-geostationary satellite, said method comprising the steps of:

(a) calculating a composite master satellite attitude/orbit estimate from said master sensor data;

(b) calculating a composite secondary satellite attitude/orbit estimate from said secondary sensor data;

(c) informing said secondary non-geostationary satellite of said composite secondary satellite attitude/orbit estimate;

(d) controlling attitude/orbit of said master satellite in response to said composite master satellite attitude/orbit estimate; and (e) controlling attitude/orbit of said secondary non-geostationary satellite in response to said composite secondary satellite attitude/orbit estimate.

2. A method as recited in claim 1, further comprising the step of:

prior to receiving said secondary sensor data, said secondary non-geostationary satellite gathering said secondary sensor data.

3. A method as recited in claim 1, wherein step (a) further comprises the step of:

(a1) prior to step (a), incorporating said secondary sensor data into said master sensor data.

4. A method as recited in claim 3, wherein step (d) comprises the steps of:

9

(d1) said master satellite calculating an individual master satellite attitude/orbit estimate from said master sensor data;

(d2) comparing said individual master satellite attitude/orbit estimate with said composite master satellite attitude/orbit estimate; and (d3) controlling attitude/orbit of said master satellite in response to said composite master satellite attitude/orbit estimate when said composite master satellite attitude/orbit estimate approximates said individual master satellite attitude/orbit estimate.

5. A method as recited in claim 4, wherein step (d3) comprises the steps of:

(d4) combining said composite master satellite attitude/orbit estimate with said individual master satellite attitude/orbit estimate to form a combined master attitude/orbit estimate when said composite master satellite attitude/orbit estimate approximates said individual master satellite attitude/orbit estimate; and (d5) controlling attitude/orbit of said master satellite in response to said combined master attitude/orbit estimate.

6. A method as recited in claim 1, wherein step (b) further comprises the step of:

(b1) prior to step (b), incorporating said master sensor data into said secondary sensor data.

7. A method as recited in claim 6, wherein step (e) comprises the steps of:

(e1) said secondary non-geostationary satellite calculating an individual secondary satellite attitude/orbit estimate from said secondary sensor data;

(e2) comparing said individual secondary satellite attitude/orbit estimate with said composite secondary satellite attitude/orbit estimate; and (e3) controlling attitude/orbit of said secondary non-geostationary satellite in response to said composite secondary satellite attitude/orbit estimate when said composite secondary satellite attitude/orbit estimate approximates said individual secondary satellite attitude/orbit estimate.

8. A method as recited in claim 7, wherein step (e3) comprises the steps of:

(e4) combining said composite secondary satellite attitude/orbit estimate with said individual secondary satellite attitude/orbit estimate to form a combined secondary attitude/ orbit estimate when said composite secondary satellite attitude/orbit estimate approximates said individual secondary satellite attitude/orbit estimate; and (e5) controlling attitude/orbit of said secondary non-geostationary satellite in response to said combined secondary attitude/orbit estimate.

9. A method as recited in claim 1, further comprising the steps of:

(a2) prior to step (a), said master satellite sending said master sensor data and said secondary sensor data to a constellation master satellite, said constellation master satellite cooperating with at least one of said satellite cluster to generate a constellation master satellite attitude/orbit estimate and a constellation secondary satellite attitude/orbit estimate from said master sensor data and said secondary sensor data;

(a3) said master satellite receiving from said constellation master satellite said constellation master satellite attitude/orbit estimate and said constellation secondary satellite attitude/orbit estimate; and

10

(c1) prior to step (c), said master satellite incorporating said constellation master satellite attitude/orbit estimate and said constellation secondary satellite attitude/orbit estimate into said composite master satellite attitude/orbit estimate and said composite secondary satellite attitude/orbit estimate.

10. A satellite attitude/orbit control system for managing a satellite cluster, comprising:

a master satellite comprising:
  sensors for gathering master sensor data from said master satellite;
  a secondary satellite transceiver for receiving secondary sensor data and for informing a secondary non-geostationary. satellite of a composite secondary satellite attitude/orbit estimate;
  a processor for calculating a composite master satellite attitude/orbit estimate from said master sensor data and for calculating a composite secondary satellite attitude/orbit estimate from said secondary sensor data; and
  actuators for controlling attitude/orbit of said master satellite in response to said composite master satellite attitude/orbit estimate; and a secondary non-geostationary satellite for gathering said secondary sensor data and responding to said composite secondary satellite attitude/orbit estimate by controlling attitude/orbit of said secondary satellite in response to said composite secondary satellite attitude/orbit estimate.

11. A satellite attitude/orbit control system for managing a satellite cluster, as recited in claim 10, wherein said processor incorporates said secondary sensor data into said master sensor data.

12. A satellite attitude/orbit control system for managing a satellite cluster, as recited in claim 11, wherein said processor also calculates an individual master satellite attitude/orbit estimate from said master sensor data, compares said individual master satellite attitude/orbit estimate with said composite master satellite attitude/orbit estimate, and said processor informs said actuators to control attitude/orbit of said master satellite in response to said composite master satellite attitude/orbit estimate when said composite master satellite attitude/orbit estimate approximates said individual master satellite attitude/orbit estimate.

13. A satellite attitude/orbit control system for managing a satellite cluster, as recited in claim 12, wherein said processor also combines said composite master satellite attitude/orbit estimate with said individual master satellite attitude/orbit estimate to form a combined master attitude/orbit estimate when said composite master satellite attitude/orbit estimate approximates said individual master satellite attitude/orbit estimate, and said processor informs said actuators to control attitude/orbit of said master satellite in response to said combined master attitude/orbit estimate.

14. A satellite attitude/orbit control system for managing a satellite cluster, as recited in claim 10, wherein said processor also incorporates said master sensor data into said secondary sensor data.

15. A satellite attitude/orbit control system for managing a satellite cluster, as recited in claim 14, wherein said secondary non-geostationary satellite also calculates an individual secondary satellite attitude/orbit estimate from said secondary sensor data, compares said individual secondary satellite attitude/orbit estimate with said composite secondary satellite attitude/orbit estimate, and controls attitude/orbit of said secondary non-geostationary satellite in response to said composite secondary satellite attitude/orbit estimate when said composite secondary satellite attitude/orbit estimate approximates said individual secondary satellite attitude/orbit estimate.

16. A satellite attitude/orbit control system for managing a satellite cluster, as recited in claim 15, wherein said secondary non-geostationary satellite also combines said composite secondary satellite attitude/orbit estimate with said individual secondary satellite attitude/orbit estimate to form a combined secondary attitude/orbit estimate when said composite secondary satellite attitude/orbit estimate approximates said individual secondary satellite attitude/orbit estimate, and said secondary non-geostationary satellite controls attitude/orbit of said secondary non-geostationary satellite in response to said combined secondary attitude/orbit estimate.

17. A satellite attitude/orbit control system for managing a satellite cluster, as recited in claim 10, further comprising:

a constellation master transceiver for sending said master sensor data and said secondary sensor data to a constellation master satellite, said constellation master satellite cooperating with at least one of said satellite cluster to generate a constellation master satellite attitude/orbit estimate and a constellation secondary satellite attitude/orbit estimate from said master sensor data and said secondary sensor data, and for receiving from said constellation master satellite said constellation master satellite attitude/orbit estimate and said constellation secondary satellite attitude/orbit estimate; and said processor also incorporating said constellation master satellite attitude/orbit estimate and said constellation secondary satellite attitude/orbit estimate into said composite master satellite attitude/orbit estimate and said composite secondary satellite attitude/orbit estimate.

\* \* \* \* \*